(12) United States Patent
O'Dell et al.

(10) Patent No.: US 8,427,770 B1
(45) Date of Patent: Apr. 23, 2013

(54) DISCRIMINATING BETWEEN PROTRUSION DEFECTS AND RECESS DEFECTS ON A DISK RECORDING MEDIUM

(75) Inventors: Thomas A. O'Dell, Sunnyvale, CA (US); Balvinder Singh, Gilroy, CA (US); Daryl M. Shiraki, San Jose, CA (US)

(73) Assignee: WD Media, LLC, San Jose, CA (US)

( * ) Notice: Subject to any disclaimer, the term of this patent is extended or adjusted under 35 U.S.C. 154(b) by 54 days.

(21) Appl. No.: 13/225,309

(22) Filed: Sep. 2, 2011

(51) Int. Cl.
*G11B 27/36* (2006.01)

(52) U.S. Cl.
USPC .............................................. 360/25; 360/31

(58) Field of Classification Search .............. 369/13.01, 369/70; 360/46, 110, 324, 25, 31, 75, 123.02, 360/53, 60, 51, 67, 322, 320; 73/105; 702/133; 700/110; 324/212
See application file for complete search history.

(56) References Cited

U.S. PATENT DOCUMENTS

| | | | |
|---|---|---|---|
| 4,812,927 A | 3/1989 | Fechner | |
| 5,130,866 A | 7/1992 | Klaassen et al. | |
| 5,450,747 A | 9/1995 | Flechsig et al. | |
| 5,563,746 A | 10/1996 | Bliss | |
| 5,808,184 A | 9/1998 | Boutaghou et al. | |
| 5,817,931 A | 10/1998 | Boutaghou | |
| 5,825,181 A | 10/1998 | Schaenzer et al. | |
| 5,870,241 A | 2/1999 | Ottesen et al. | |
| 5,901,001 A * | 5/1999 | Meyer et al. | 360/25 |
| 6,019,503 A | 2/2000 | Abraham et al. | |
| 6,052,243 A | 4/2000 | Shimada | |
| 6,057,975 A | 5/2000 | Yaeger et al. | |
| 6,088,176 A | 7/2000 | Smith et al. | |
| 6,181,520 B1 | 1/2001 | Fukuda | |
| 6,196,062 B1 | 3/2001 | Wright et al. | |
| 6,262,572 B1 | 7/2001 | Franco et al. | |
| 6,293,135 B1 | 9/2001 | Marchon et al. | |
| 6,310,739 B1 | 10/2001 | McEwen et al. | |
| 6,311,551 B1 | 11/2001 | Boutaghou | |
| 6,452,735 B1 | 9/2002 | Egan et al. | |
| 6,494,085 B2 | 12/2002 | Wakefield et al. | |
| 6,577,466 B2 | 6/2003 | Meyer et al. | |
| 6,580,572 B1 | 6/2003 | Yao et al. | |
| 6,623,158 B2 | 9/2003 | Abraham et al. | |
| 6,865,040 B2 | 3/2005 | Fayeulle et al. | |
| 6,899,456 B2 | 5/2005 | Sundaram et al. | |
| 6,940,669 B2 * | 9/2005 | Schaenzer et al. | 360/25 |
| 7,027,263 B2 * | 4/2006 | Ottesen et al. | 360/234.4 |
| 7,064,659 B2 | 6/2006 | Baumgartner et al. | |
| 7,121,133 B2 | 10/2006 | Chu et al. | |
| 7,382,565 B2 | 6/2008 | Khurshudov et al. | |
| 7,425,719 B2 | 9/2008 | Treves et al. | |
| 7,656,763 B1 | 2/2010 | Jin et al. | |
| 7,684,138 B2 | 3/2010 | Kitamura et al. | |
| 7,780,344 B2 | 8/2010 | Yanagisawa et al. | |
| 7,929,235 B2 | 4/2011 | Meier et al. | |
| 2008/0262643 A1 | 10/2008 | Creigh et al. | |

* cited by examiner

*Primary Examiner* — Ali Neyzari

(57) ABSTRACT

An apparatus is disclosed comprising a thermal sensor operable to detect at least one protrusion defect and at least one recess defect on a disk, the thermal sensor operable to generate a sensor signal. An attack time of the sensor signal is measured when the thermal sensor passes over one of the protrusion defect and the recess defect, and the protrusion defect is discriminated from the recess defect based on the attack time.

14 Claims, 4 Drawing Sheets

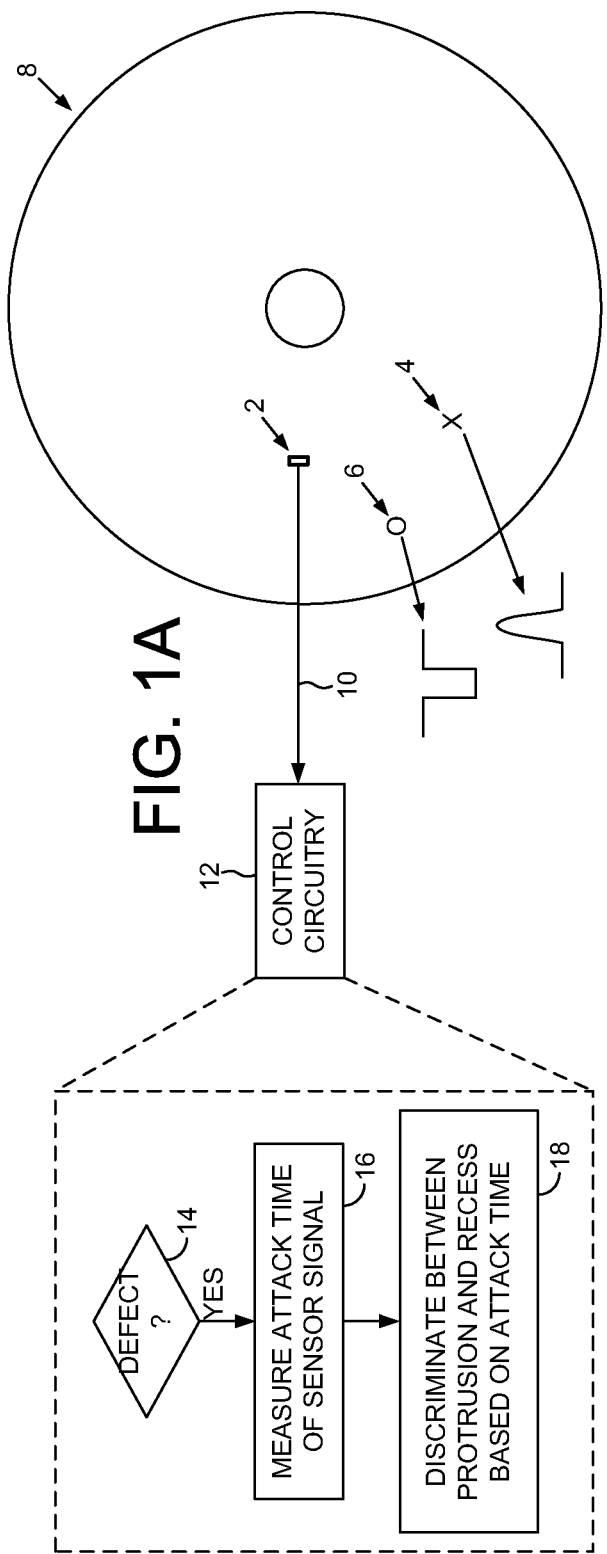
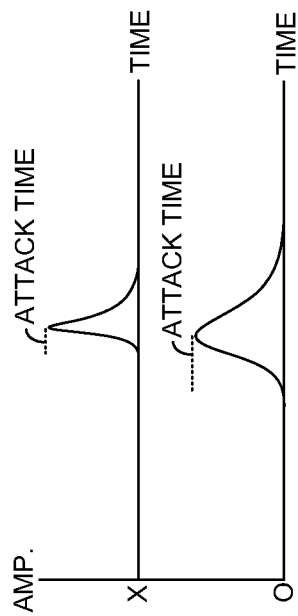
FIG. 1A
FIG. 1B
FIG. 1C

US 8,427,770 B1

DISCRIMINATING BETWEEN PROTRUSION DEFECTS AND RECESS DEFECTS ON A DISK RECORDING MEDIUM

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

A defect scan may be performed on a number of disks as part of a quality control procedure when manufacturing the disks. If an excessive number of defects are detected, a disk may be discarded as unusable, or the manufacturing process of the disks may be modified in an attempt to reduce the number of defects. However, protrusion defects (e.g., due to an asperity on the disk) are typically considered more significant than recess defects (e.g., a pit on the disk) because a protrusion defect may damage the head due to a collision. It is therefore important to discriminate between protrusion defects and recess defects to avoid unnecessary reduction in yield or unnecessary modifications to the disk manufacturing process.

A defect scan may also be performed after installing a disk into a disk drive as part of a manufacturing procedure for the disk drive. If a defect is detected during the defect scan, the area associated with the defect may be mapped out as unusable. If the defect is caused by a protrusion on the disk (asperity), the area mapped out as defective may include a margin which prevents any part of the head from colliding with the protrusion. If a large number of protrusion defects are detected, the overall capacity of the disk may be significantly reduced. It is therefore desirable to discriminate between true protrusion defects and recess defects which may generate a signature similar to protrusion defects.

BRIEF DESCRIPTION OF THE DRAWINGS

FIG. 1A shows an apparatus comprising a thermal sensor for detecting at least one protrusion defect and at least one recess defect on a disk according to an embodiment of the present invention.

FIG. 1B is a flow diagram according to an embodiment of the present invention wherein a protrusion defect is discriminated from a recess defect based on an attack time of a sensor signal.

FIG. 1C shows an attack time of a pulse in a sensor signal for a protrusion defect and a recess defect according to an embodiment of the present invention.

DETAILED DESCRIPTION OF EMBODIMENTS OF THE INVENTION

Figure 2A:
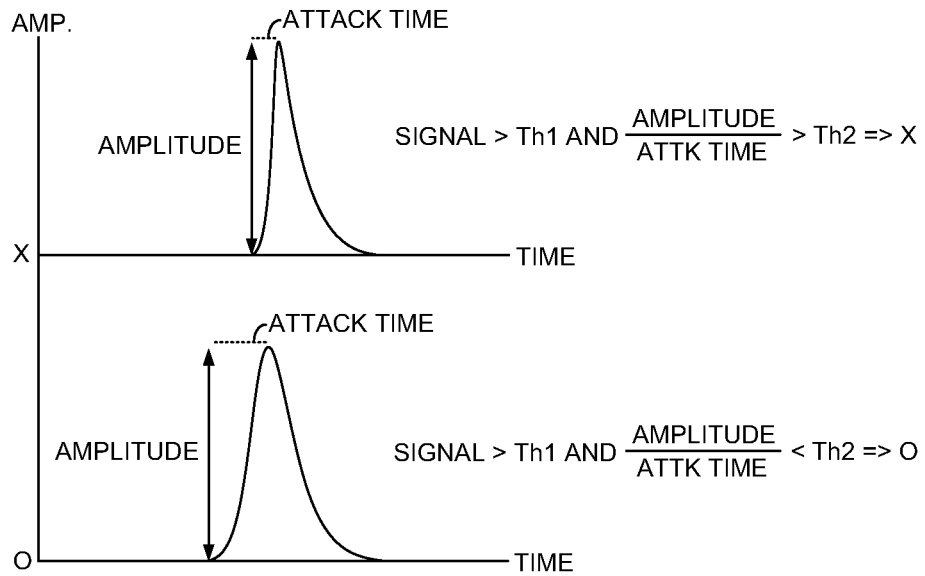
FIG. 2A shows an embodiment of the present invention wherein a protrusion defect is discriminated from a recess defect based on a ratio of an amplitude to an attack time of a pulse representing a defect.

FIG. 1A shows an apparatus according to an embodiment of the present invention comprising a thermal sensor 2 operable to detect at least one protrusion defect (x) 4 and at least one recess defect (o) 6 on a disk 8, the thermal sensor 2 operable to generate a sensor signal 10. The apparatus further comprises control circuitry 12 operable to execute the flow diagram of FIG. 1B, wherein an attack time of the sensor signal is measured (step 16 and FIG. 1C) when the thermal sensor passes over one of the protrusion defect (x) and the recess defect (o) (step 14), and the control circuitry discriminates between the protrusion defect and the recess defect based on the attack time (step 18).

The embodiments of the present invention may be implemented by any suitable apparatus. In one embodiment, the apparatus of FIG. 1A comprises a spin stand for evaluating disks during development and/or manufacturing of the disks. The spin stand may analyze the disks using the defect scan in order to modify a manufacturing process, and/or to qualify the disks prior to being installed into a production disk drive. In an alternative embodiment, the apparatus of FIG. 1A may comprise a production disk drive that may perform the defect scan as part of a manufacturing procedure or while the disk drive is deployed in the field. For example, a production disk drive may analyze the disks using the defect scan in order to map out areas of the disk as unusable, and/or to control the fly height of the head so as to avoid colliding with protrusion defects. In one embodiment, a production disk drive may accumulate the defect scan data for later analysis by the disk drive manufacturer in order to modify a manufacturing process of the disks and/or the disk drives.

Any suitable thermal sensor 2 may be employed in the embodiments of the present invention. In one embodiment, the thermal sensor 2 comprises a magnetoresistive (MR) element which may be the read element of a read head, or a separate MR element designated for defect scanning. In one embodiment, a resistivity of the thermal sensor 2 changes with temperature (e.g., increases with temperature) wherein the protrusion defect 4 and the recess defect 6 cause the temperature (and resistivity) of the thermal sensor 2 to increase at different rates. Accordingly in this embodiment, the sensor signal 10 may reflect the change in the resistivity of the thermal sensor 2, such as the change in a voltage across the thermal sensor 2 when applying a current to the thermal sensor 2.

FIG. 1C shows an example sensor signal comprising a pulse representing the response of the thermal sensor 2 as it passes over a protrusion defect (x) 4 and a recess defect (o) 6. As illustrated in FIG. 1C, the attack time of the pulse representing the protrusion defect (x) 4 is shorter than the attack time of the pulse representing the recess defect (o) 6. That is, the protrusion defect (x) 4 causes a faster thermal transient as the thermal sensor collides with the asperity, whereas the recess defect (o) 6 causes a slower thermal transient. Accordingly, in one embodiment the attack time of a pulse in the sensor signal 10 is evaluated in order to discriminate between a protrusion defect (x) 4 and a recess defect (6). In the embodiment of FIG. 1 C, the attack time is measured from the base of the pulse to the peak of the pulse. However, the attack time may be measured in any suitable manner, such as by measuring the time between 10% to 90% of the pulse amplitude, or any other suitable percentages. In another embodiment, the attack time may be measured as the derivative (slope) of the pulse at any suitable time during the excitation interval.

In one embodiment, the amplitude of the protrusion defect pulses and the recess defect pulses in the sensor signal 10 are substantially equal and substantially constant. That is, the thermal response of the sensor 2 is substantially equal and constant regardless as to the size and/or shape of the protrusion or recess. In another embodiment, the thermal response of the sensor 2 may vary based on the type of defect (protrusion or recess) and/or based on the size and/or shape of the defect. Accordingly, in one embodiment the control circuitry may evaluate the amplitude of the pulses together with the attack times in order to discriminate between the defect types as illustrated in FIG. 2A.

Figure 2B:
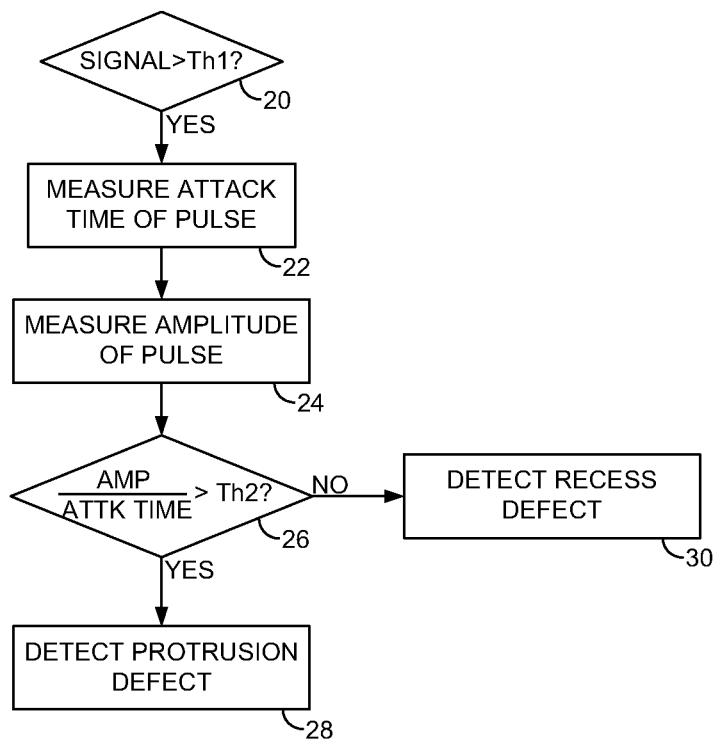
FIG. 2B is a flow diagram according to an embodiment of the present invention wherein a protrusion defect is discriminated from a recess defect based on a ratio of an amplitude to an attack time of the pulse.

Referring to the flow diagram of FIG. 2B, when the sensor signal exceeds a threshold (step 20) indicating that the thermal sensor is passing over a defect, the attack time of the pulse is measured (step 22) and the amplitude of the pulse is measured (step 24). The ratio of the amplitude to the attack time is then evaluated to discriminate between a protrusion defect and a recess defect. In the example of FIG. 2B, if the amplitude to attack time ratio exceeds a threshold (step 26), a protrusion defect is detected (step 28) otherwise a recess defect is detected (step 30).

In the example of FIG. 2A, the amplitude of the pulse is measured from the base of the pulse to the peak of the pulse. However, similar to the attack time, the amplitude may be measured in any suitable manner, such as the change in amplitude over the interval selected to measure the attack time. For example, if the attack time is measured from 10% to 90% of the pulse amplitude, the corresponding change in amplitude from 10% to 90% may be measured at step 24.

Figure 3A:
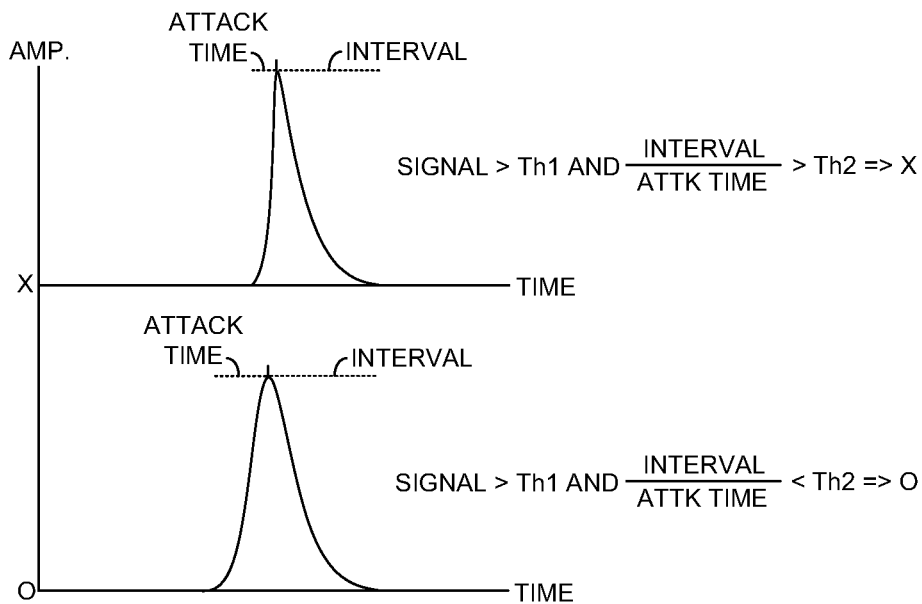
FIG. 3A shows an embodiment of the present invention wherein a protrusion defect is discriminated from a recess defect based on a ratio of an interval to an attack time of a pulse representing a defect.
Figure 3B:
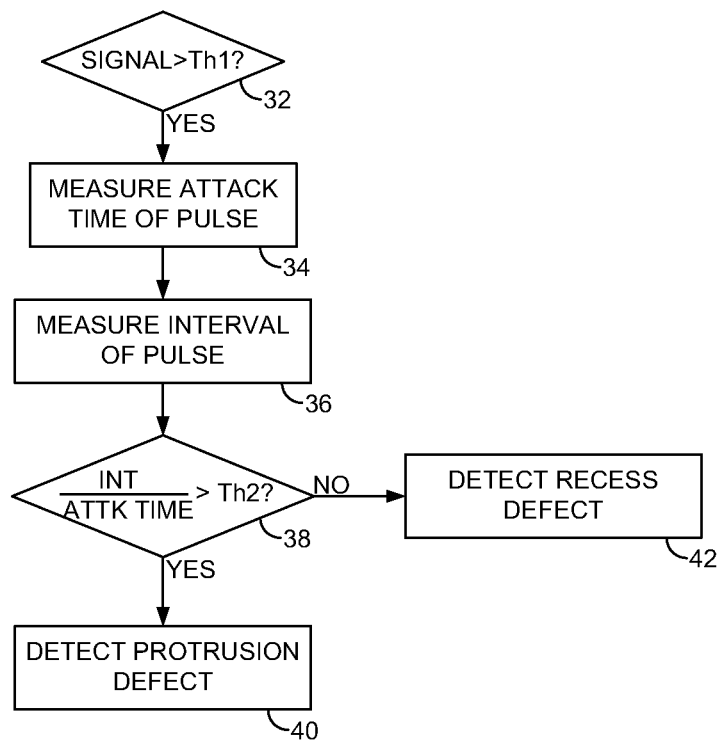
FIG. 3B is a flow diagram according to an embodiment of the present invention wherein a protrusion defect is discriminated from a recess defect based on a ratio of an interval to an attack time of the pulse.

FIG. 3A shows an alternative embodiment of the invention wherein the control circuitry executes the flow diagram of FIG. 3B to discriminate between a protrusion defect and a recess defect based on the attack time and an interval of the pulse. When the sensor signal exceeds a threshold (step 32) indicating that the thermal sensor is passing over a defect, the attack time of the pulse is measured (step 34) and the interval of the pulse is measured (step 36). The ratio of the interval to the attack time is then evaluated to discriminate between a protrusion defect and a recess defect. In the example of FIG. 3B, if the interval to attack time ratio exceeds a threshold (step 38), a protrusion defect is detected (step 40) otherwise a recess defect is detected (step 42).

In the example of FIG. 3A, the interval of the pulse is measured as the decay time of the pulse from the peak to the base. However, similar to the attack time, the interval may be measured in any suitable manner, such as any suitable percentage of the decay time from the peak to the base (e.g., 10% to 90%). In another embodiment, the interval measured at step 36 may include at least part of the excitation time of the pulse, and in one embodiment the interval may include substantially the entire interval of the pulse.

In one embodiment, the control circuitry may evaluate multiple metrics to discriminate between a protrusion defect and a recess defect. For example, the control circuitry may measure the amplitude to attack time ratio as in FIG. 2A as well as the interval to attack time as in FIG. 3A, and evaluate both metrics to discriminate between the type of defects.

Figure 4A:
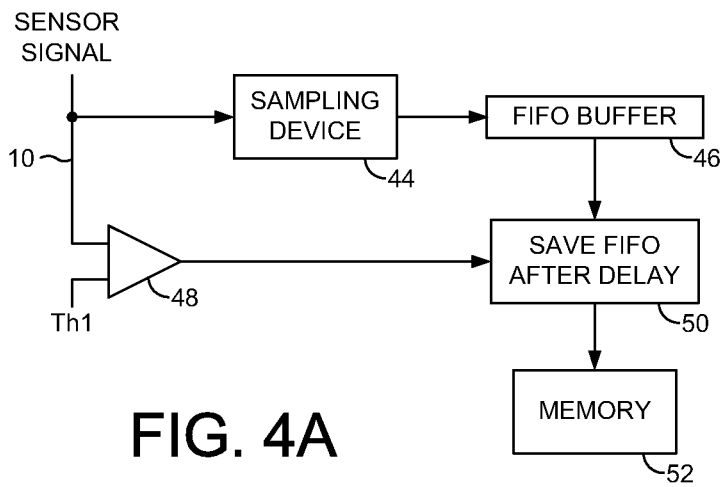
FIG. 4A shows control circuitry according to an embodiment of the present invention wherein samples of the sensor signal are stored in a first-in-first-out (FIFO) buffer which are then transferred to a memory for analysis when the sensor signal exceeds a threshold indicating a defect.
Figure 4B:
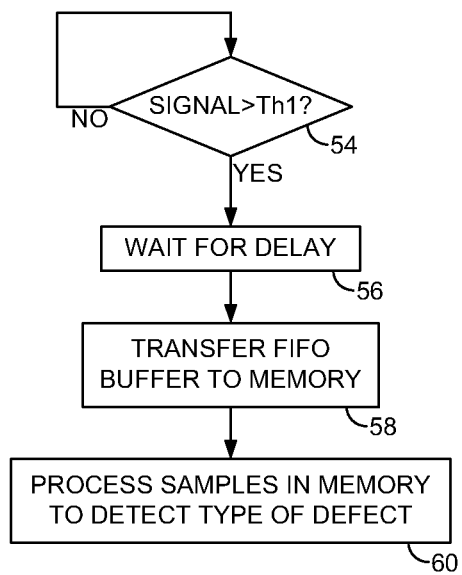
FIG. 4B is a flow diagram according to an embodiment of the present invention wherein when a defect is detected, the samples of the sensor signal are transferred from the FIFO buffer to a memory for evaluation.

FIG. 4A and the flow diagram of FIG. 4B illustrate another embodiment of the present invention wherein a sampling device 44 samples the sensor signal 10. The samples of the sensor signal are temporarily stored in a first-in-first-out (FIFO) buffer 46 able to store enough samples needed to discriminate between the protrusion and recess defects when evaluating a pulse of the sensor signal 10. When the sensor signal 10 exceeds a threshold at comparator 48 (step 54), the control circuitry triggers delay circuitry 50 and after a sufficient delay to buffer enough of the signal samples in the FIFO buffer 46 (step 56), the content of the FIFO buffer 46 are accumulated in a memory 52 (step 58). The control circuitry then measures the attack time in response to the accumulated samples of the sensor signal stored in the memory 52 in order to discriminate between protrusion and recess defects (step 60). Accordingly, the control circuitry in this embodiment accumulates the samples of the sensor signal 10 when a pulse is detected in the sensor signal 10 which reduces the amount of memory 52 as well as the processing time needed to evaluate the signal samples stored in the memory 52.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. An apparatus comprising:
    a thermal sensor operable to detect at least one protrusion defect and at least one recess defect on a disk, the thermal sensor operable to generate a sensor signal; and
    control circuitry operable to:
        measure an attack time of the sensor signal when the thermal sensor passes over one of the protrusion defect and the recess defect; and
        discriminate between the protrusion defect and the recess defect based on the attack time.

2. The apparatus as recited in claim 1, wherein the control circuitry is further operable to:

measure an amplitude of a pulse of the sensor signal when the thermal sensor passes over one of the protrusion defect and the recess defect; and discriminate between the protrusion defect and the recess defect based on the attack time and the amplitude of the pulse.

3. The apparatus as recited in claim 2, wherein the control circuitry is further operable to discriminate between the protrusion defect and the recess defect based on a ratio of the amplitude to the attack time of the pulse.

4. The apparatus as recited in claim 1, wherein the control circuitry is further operable to:

measure an interval of a pulse of the sensor signal when the thermal sensor passes over one of the protrusion defect and the recess defect; and discriminate between the protrusion defect and the recess defect based on the attack time and the interval of the pulse.

5. The apparatus as recited in claim 4, wherein the interval of the pulse is a decay time of the pulse.

6. The apparatus as recited in claim 4, wherein the control circuitry is further operable to discriminate between the protrusion defect and the recess defect based on a ratio of the interval to the attack time of the pulse.

7. The apparatus as recited in claim 1, wherein the control circuitry is further operable to:

sample the sensor signal;

accumulate samples of the sensor signal when the sensor signal exceeds a threshold; and measure the attack time in response to the accumulated samples of the sensor signal.

8. A method of detecting defects on a disk, the method comprising:

generating a sensor signal by detecting at least one protrusion defect and at least one recess defect on a disk;

measuring an attack time of the sensor signal when detecting one of the protrusion defect and the recess defect; and discriminating between the protrusion defect and the recess defect based on the attack time.

9. The method as recited in claim 8, further comprising:

measuring an amplitude of a pulse of the sensor signal when detecting one of the protrusion defect and the recess defect; and discriminating between the protrusion defect and the recess defect based on the attack time and the amplitude of the pulse.

10. The method as recited in claim 9, further comprising discriminating between the protrusion defect and the recess defect based on a ratio of the amplitude to the attack time of the pulse.

11. The method as recited in claim 8, further comprising:

measuring an interval of a pulse of the sensor signal when detecting one of the protrusion defect and the recess defect; and discriminating between the protrusion defect and the recess defect based on the attack time and the interval of the pulse.

12. The method as recited in claim 11, wherein the interval of the pulse is a decay time of the pulse.

13. The method as recited in claim 11, further comprising discriminating between the protrusion defect and the recess defect based on a ratio of the interval to the attack time of the pulse.

14. The method as recited in claim 8, further comprising:

sampling the sensor signal;

accumulating samples of the sensor signal when the sensor signal exceeds a threshold; and measuring the attack time in response to the accumulated samples of the sensor signal.

* * * * *